US008121243B2

(12) United States Patent
Yonemoto et al.

(10) Patent No.: US 8,121,243 B2
(45) Date of Patent: Feb. 21, 2012

(54) IN-CORE-MONITOR-GUIDE-TUBE SUPPORTING APPARATUS

(75) Inventors: Satoshi Yonemoto, Hyogo (JP); Shigeyuki Watanabe, Hyogo (JP); Makoto Nakajima, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 644 days.

(21) Appl. No.: 11/475,251

(22) Filed: Jun. 27, 2006

(65) Prior Publication Data

US 2007/0019774 A1 Jan. 25, 2007

(30) Foreign Application Priority Data

Jun. 29, 2005 (JP) .................................. 2005-189859
Nov. 28, 2005 (JP) .................................. 2005-342413

(51) Int. Cl.
*G21C 9/00* (2006.01)
*G21C 17/00* (2006.01)
(52) U.S. Cl. ........................................ 376/303; 376/254
(58) Field of Classification Search .................. 376/254, 376/303
See application file for complete search history.

(56) References Cited

U.S. PATENT DOCUMENTS

| | | | | |
|---|---|---|---|---|
| 3,208,914 A | * | 9/1965 | Dickson ........................ | 376/262 |
| 5,057,270 A | | 10/1991 | Chevereau | |
| 5,078,957 A | * | 1/1992 | Tower et al. .................. | 376/254 |
| 5,282,232 A | | 1/1994 | Chevereau et al. | |
| 5,357,547 A | | 10/1994 | Obermeyer et al. | |
| 5,479,464 A | * | 12/1995 | DeMario et al. ............... | 376/364 |
| 5,519,741 A | * | 5/1996 | Suzuki et al. .................. | 376/249 |
| 5,550,883 A | * | 8/1996 | Bougis .......................... | 376/302 |
| 5,995,575 A | * | 11/1999 | Matsumoto et al. ........... | 376/303 |
| 2003/0128793 A1 | * | 7/2003 | Karino et al. .................. | 376/254 |

FOREIGN PATENT DOCUMENTS

| | | |
|---|---|---|
| CN | 1078822 A | 11/1993 |
| JP | 4-268497 A | 9/1992 |
| JP | 10-111384 A | 4/1998 |
| JP | 2000-187093 A | 7/2000 |

OTHER PUBLICATIONS

Merriam-Webster's Collegiate Dictionary, tenth Edition, 1999, Merriam-Webster, Inc., Springfield, MA (USA), p. 288.*
Chinese Office Action dated Dec. 26, 2008 issued in corresponding Chinese Application No. 200610094616.5.

* cited by examiner

*Primary Examiner* — Johnannes P Mondt
(74) *Attorney, Agent, or Firm* — Westerman, Hattori, Daniels & Adrian, LLP

(57) ABSTRACT

Monitor-guide-tube fixing sections are fixed to portions on a core support plate side of a plurality of in-core monitor guide tubes disposed in a reactor vessel. The monitor-guide-tube fixing sections are fixed to the core support plate disposed in the reactor vessel to fix the in-core monitor guide tubes to the core support plate. This makes it possible to realize improvement of rigidity of the fixed sections of the in-core monitor guide tubes. A tie plate is fixed to the in-core monitor guide tubes. The in-core monitor guide tubes are coupled by the tie plate. This makes it possible to realize improvement of rigidity of the entire in-core monitor guide tubes. As a result, it is possible to realize vibration damping for the in-core monitor guide tubes.

2 Claims, 13 Drawing Sheets

IN-CORE-MONITOR-GUIDE-TUBE SUPPORTING APPARATUS

BACKGROUND OF THE INVENTION

1. Field of the Invention

The present invention relates to an in-core-monitor-guide-tube supporting apparatus.

2. Description of the Related Art

An in-core monitor guide tube is disposed in a reactor vessel to make it possible to measure neutron fluxes during the operation of a boiling-water reactor and the like. A plurality of in-core monitor guide tubes are disposed in the reactor vessel in a substantially cylindrical shape. Thus, the in-core monitor guide tubes are integrally fixed by a beam or the like to be able to acquire predetermined rigidity when the in-core monitor guide tubes are disposed. For example, in Japanese Patent Application Laid-Open No. 2000-187093, a neutron-flux-monitor-guide-tube supporting apparatus has a cantilever beam in which corrugated sections of a bent shape and beam sections are alternately formed and a clamp that can be fixed to the cantilever beam. A plurality of in-core monitor guide tubes are disposed in the corrugated sections and the clamp is fixed to the cantilever beam to straddle the in-core monitor guide tubes in this state. In this way, the neutron-flux-monitor-guide-tube supporting apparatus integrally supports the in-core monitor guide tubes. This makes it possible to, when a plurality of in-core monitor guide tubes are disposed in a reactor vessel, improve rigidity of the in-core monitor guide tubes.

However, although the in-core monitor guide tubes are disposed between a bottom surface and a core support plate in the reactor vessel, some in-core monitor guide tubes are disposed between a top cover and the core support plate in the reactor vessel. Since control-rod guide tubes are provided in this section in the reactor vessel, a space for arranging the in-core monitor guide tubes is limited. When the in-core monitor guide tubes are disposed between the top cover and the core support plate in the reactor vessel, the in-core monitor guide tubes may have to be reduced in diameter. In this case, it is likely that the in-core monitor guide tubes have lower strength against vibration.

SUMMARY OF THE INVENTION

It is an object of the present invention to at least partially solve the problems in the conventional technology.

According to an aspect of the present invention, an in-core-monitor-guide-tube supporting apparatus arranged inside a reactor vessel, the reactor vessel including a top cover and a core support plate, includes a plurality of in-core monitor guide tubes arranged in the reactor vessel in a space defined by the top cover and the core support plate; a monitor-guide-tube fixing arrangement corresponding to each of the in-core monitor guide tubes that fixes a corresponding one of the in-core monitor guide tube to a surface of the core support plate that opposes the top cover; a reinforcing arrangement corresponding to each of the monitor-guide-tube fixing arrangement that integrally fixes a corresponding one of the monitor-guide-tube fixing arrangement to a corresponding one of the in-core monitor guide tube; and a coupling arrangement that couples all the in-core monitor guide tubes at a position that is closer to the top cover than the reinforcing arrangement.

According to another aspect of the present invention, an in-core-monitor-guide-tube supporting apparatus arranged inside a reactor vessel, the reactor vessel includes a top cover and a core support plate, including a plurality of in-core monitor guide tubes arranged in the reactor vessel in a space defined by the top cover and the core support plate, wherein each of the in-core monitor guide tubes being substantially cylindrical; a monitor-guide-tube fixing arrangement corresponding to each of the in-core monitor guide tubes that fixes the a corresponding one of the in-core monitor guide tube to a surface of the core support plate that opposes the top cover; and a reinforcing arrangement corresponding to each of the monitor-guide-tube fixing arrangement that integrally fixes a corresponding one of the monitor-guide-tube fixing arrangement to a corresponding one of the in-core monitor guide tube, wherein a length of the reinforcing arrangement in a direction of a long axis of the in-core monitor guide tube is between 50% to 100% of a length of the in-core monitor guide tube in the direction of the long axis.

According to still another aspect of the present invention, an in-core-monitor-guide-tube supporting apparatus arranged inside a reactor vessel, the reactor vessel includes a top cover and a core support plate, includes a plurality of in-core monitor guide tubes arranged in the reactor vessel in a space defined by the top cover and the core support plate; and a coupling arrangement that couples all the in-core monitor guide tubes, that holds all the in-core monitor guide tubes, and that is attached to the reactor vessel.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments. Elements in the embodiments described below include elements that can be replaced and can easily be arrived at by those skilled in the art or elements substantially identical with one another.

Figure 1:
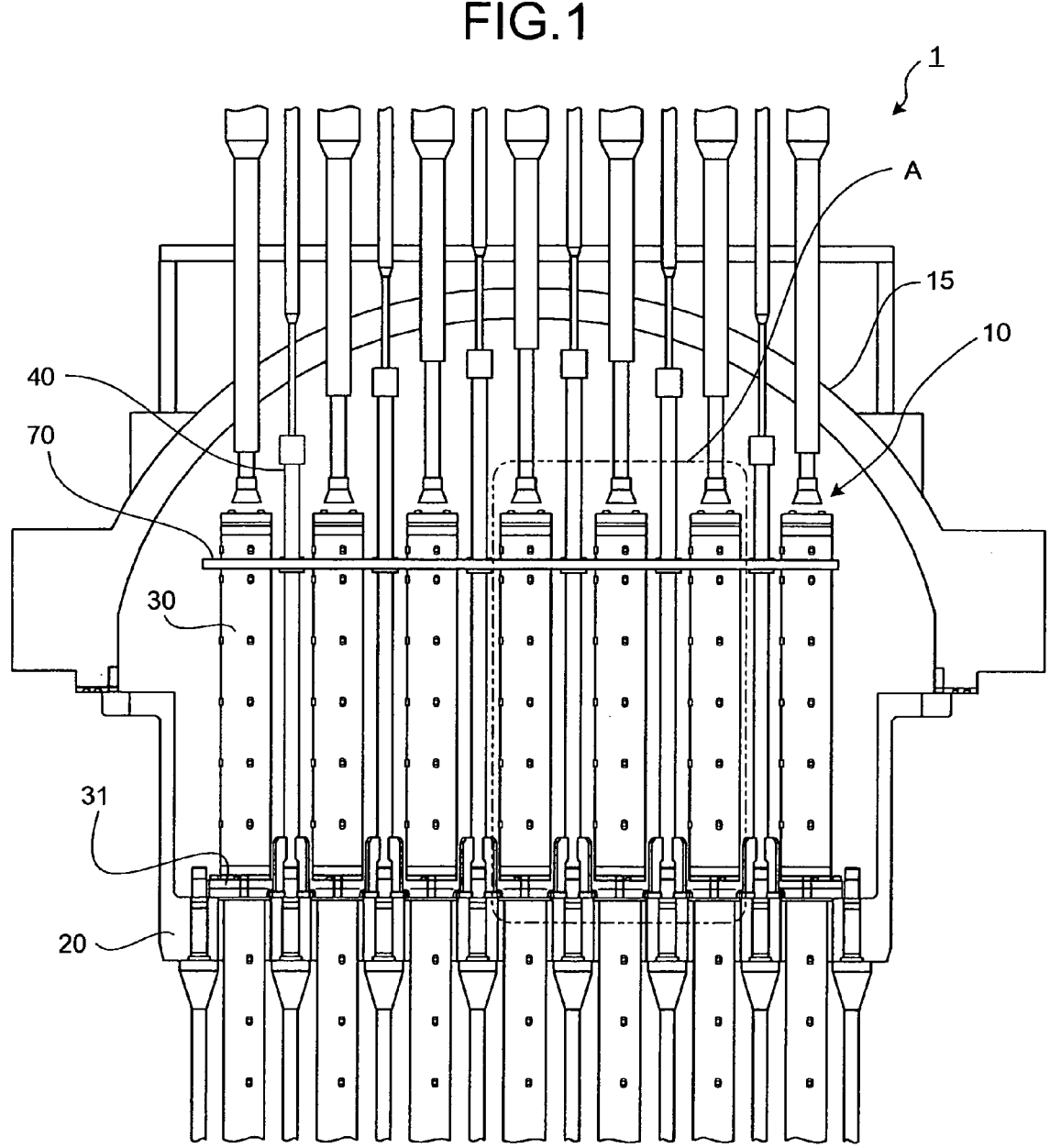
FIG. 1 is a schematic of relevant parts of a reactor vessel that includes an in-core-monitor-guide-tube supporting apparatus according to a first embodiment of the present invention.

FIG. 1 is a schematic of relevant parts of a reactor vessel 1 hat includes an in-core-monitor-guide-tube supporting apparatus 10 according to a first embodiment of the present invention. The reactor vessel 1 has a cylindrical body (not shown) of a substantially cylindrical shape. The cylindrical body is provided such that an axial direction of the cylindrical shape thereof is a vertical direction. A top cover 15 formed in a hemispherical shape and having a cavity on the inner side thereof is fixed in an upper portion of the cylindrical body. The top cover 15 is fixed to the cylindrical body to be convex upward. A bottom mirror (not shown) formed in a hemispherical shape and having a cavity on the inner side thereof as in the top cover 15 is fixed to a lower portion of the cylindrical body. The bottom mirror is fixed to the cylindrical body to be convex downward. Consequently, the inside of the reactor vessel 1 is formed as a closed space. The in-core-monitor-guide-tube supporting apparatus 10 is provided in the reactor vessel 1. A plurality of control-rod guide tubes 30 and a plurality of in-core monitor guide tubes 40 are fixed to a core support plate 20, and the core support plate 20 is fixed to the reactor vessel 1.

Figure 2:
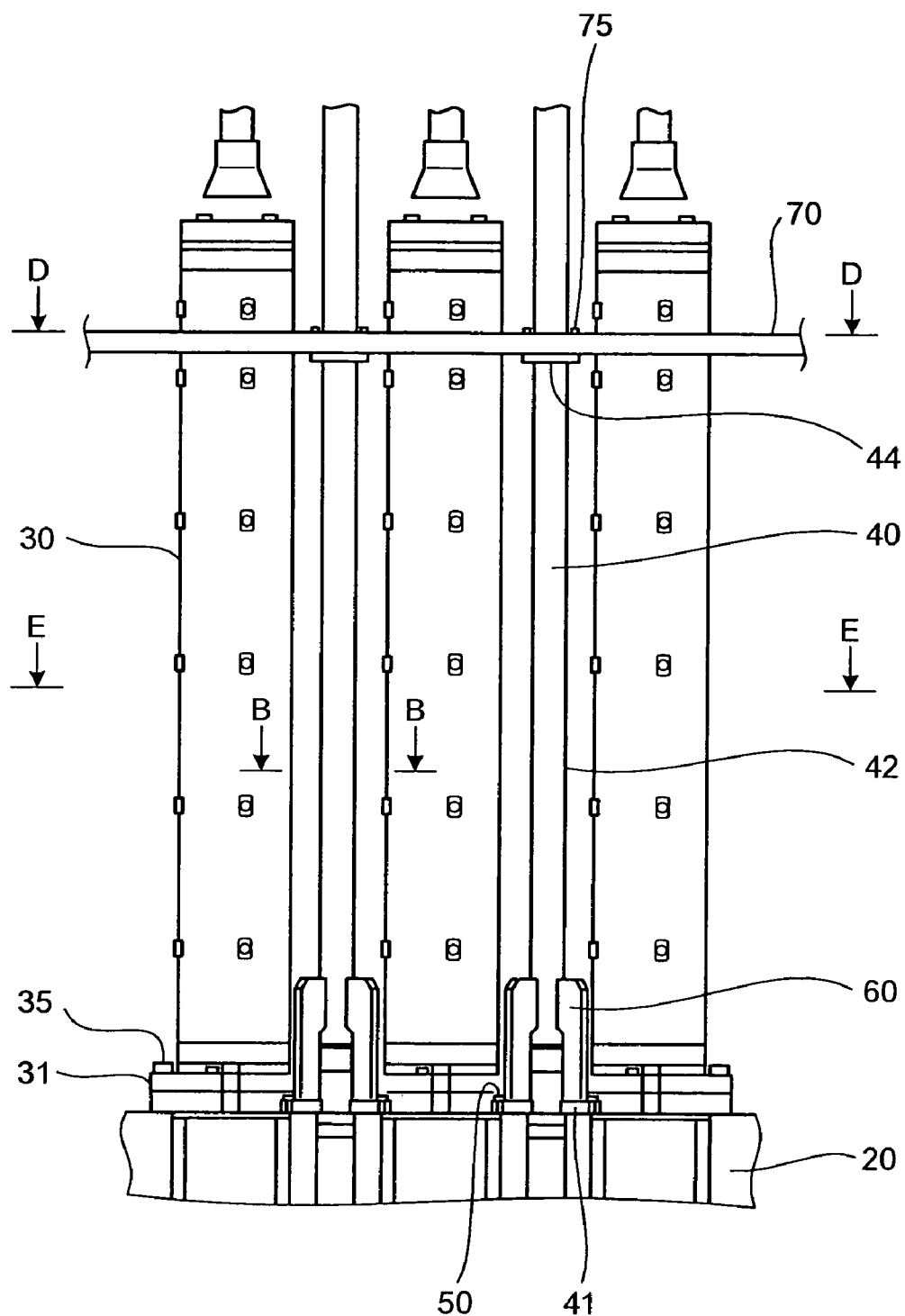
FIG. 2 is a detailed diagram of a section A in FIG. 1.

FIG. 2 is a detailed view of a section A in FIG. 1. Each of the control-rod guide tubes 30 functions as guide tubes for a cluster type control rod (not shown) in which a control rod (not shown) is driven. All the control rods in all the control-rod guide tubes 30 are collectively driven. Thus, the number of control-rod guide tubes 30 is the same as the number of the control rods. The control-rod guide tubes 30 is a substantially cylindrical. The control-rod guide tubes 30 are disposed between the top cover 15 and the core support plate 20 in the reactor vessel 1 such that an axial direction of the cylindrical shape is the vertical direction. Control-rod-guide-tube fixing sections 31 formed by flanges having a substantially rectangular shape when viewed in the axial direction of the control-rod guide tube 30 are fixed to ends on the core support plate 20 side in the control-rod guide tubes 30, that is, at lower ends of the control-rod guide tubes 30. It is possible to fix the control-rod-guide-tube fixing sections 31 to a surface on the top cover 15 side of the core support plate 20 with bolts 35. It is possible to fix the control-rod guide tubes 30 to the core support plate 20 by fixing the control-rod-guide-tube fixing sections 31 to an upper surface of the core support plate (see FIG. 2) 20. In other words, the control-rod guide tubes 30 are detachably fixed to the surface on the top cover 15 side of the core support plate 20 by the control-rod-guide-tube fixing sections 31.

The in-core monitor guide tubes 40 are provided as guide tubes for a plurality of in-core neutron monitors (not shown) that measure neutrons in the reactor vessel 1. The number of in-core neutron monitors is the same as the number of in-core monitor guide tubes 40. A shape of the in-core neutron monitors is a substantially cylindrical shape that is the same as the shape the control-rod guide tubes 30. The in-core neutron monitors are disposed between the top cover 15 and the core support plate 20 in the reactor vessel 1.

Figure 3:
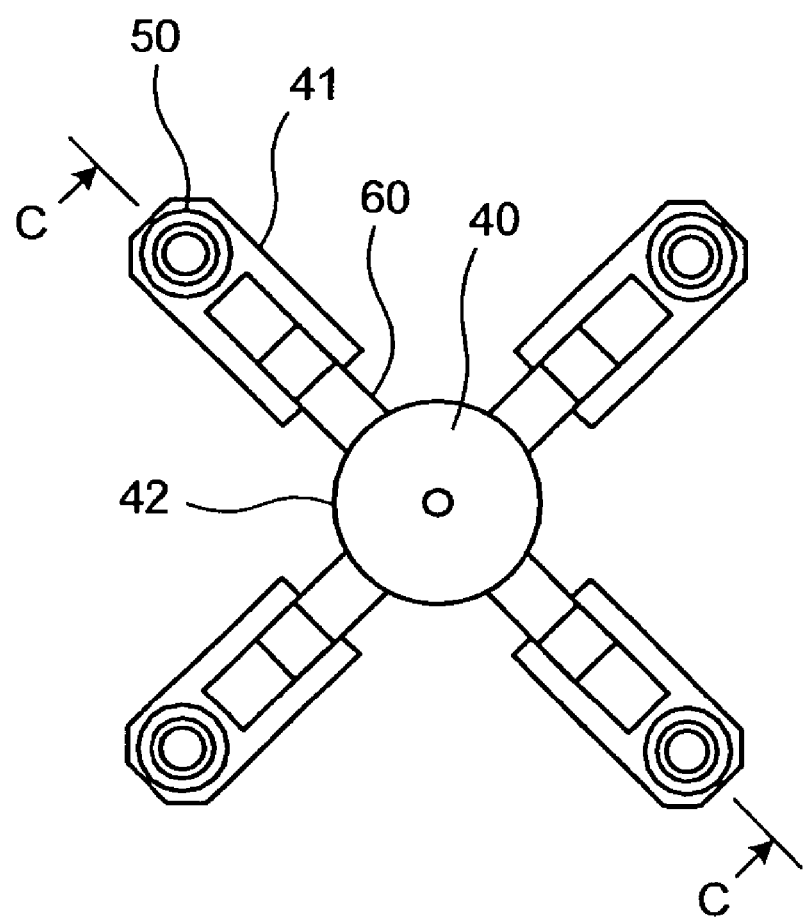
FIG. 3 is a sectional view along B-B in FIG. 2.
Figure 4:
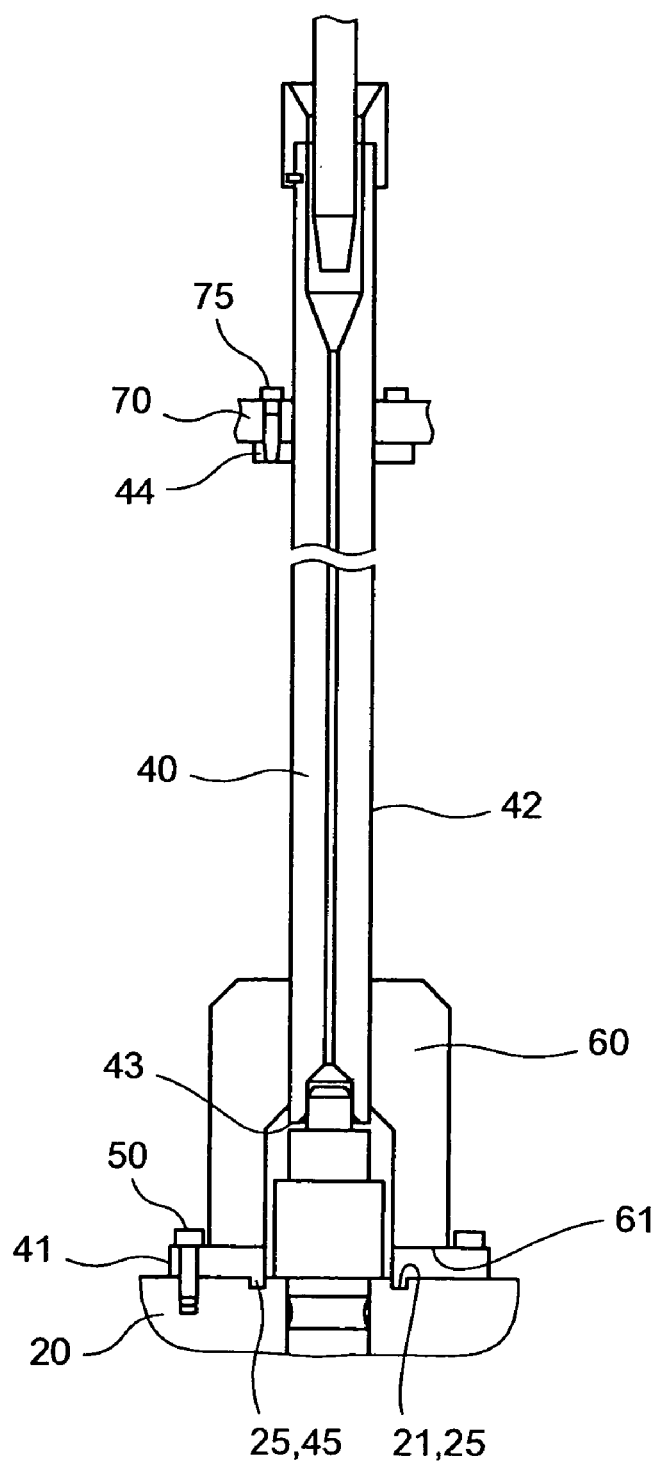
FIG. 4 is a sectional view along C-C in FIG. 3.

FIG. 3 is a sectional view along B-B in FIG. 2. FIG. 4 is a sectional view along C-C in FIG. 3. Rib plates 60 serving as reinforcing sections are provided near an end on the core support plate 20 side of the in-core monitor guide tube 40, that is, near a lower end 43 of the in-core monitor guide tube 40. The rib plates 60 are connected to an outer peripheral surface 42 of the in-core monitor guide tube 40. A thickness direction of the plates is a tangential direction of a circular shape at the time when the in-core monitor guide tube 40 is viewed in an axial direction of the cylindrical shape that is the shape of the in-core monitor guide tube 40. The rib plates 60 have a predetermined width in a direction in which the rib plates 60 project outward in a radial direction of the circular shape from the outer peripheral surface 42 of the in-core monitor guide tube 40. The rib plates 60 connected to the outer peripheral surface 42 near the lower end 43 of the in-core monitor guide tube 40 project further in the direction of the core support plate 20 than the lower end 43 of the in-core monitor guide tube 40. Four rib plates 60 formed in this way are connected to one in-core monitor guide tube 40 in the same shape and connected at equal intervals in a peripheral direction of the cylindrical shape. In other words, the four rib plates 60 are disposed to form a cross shape when the in-core monitor guide tube 40 is viewed in the axial direction.

Monitor-guide-tube fixing sections 41 are connected to rib plate lower ends 61 that are ends on the core support plate 20 side of the rib plates 60. Four monitor-guide-tube fixing sections 41 are provided in the same shape. One monitor-guide-tube fixing section 41 is connected to one rib plate 60. The respective monitor-guide-tube fixing sections 41 have a substantially rectangular-parallelepiped shape. A width in the thickness direction of the rib plates 60 is larger than the thickness of the rib plates 60. The width of the monitor-guide-tube fixing sections 41 in the radial direction of the circular shape, which is the shape of the in-core monitor guide tube 40, is larger than the width in the same direction of the rib plates 60. The monitor-guide-tube fixing sections 41 project further outward in the radial direction of the circular shape than the rib plates 60. The rib plates 60 are connected to both the monitor-guide-tube fixing sections 41 formed in such a shape and the in-core monitor guide tube 40. In other words, the rib plates 60 integrally fix the monitor-guide-tube fixing sections 41 to the in-core monitor guide tube 40.

Projections 45 projecting in a direction opposite to the direction in the monitor-guide-tube fixing sections 41 in which the in-core monitor guide tube 40 is formed, that is, a direction of the core support plate 20 are formed on surfaces on the core support plate 20 side of the monitor-guide-tube fixing sections 41. The projections 45 project in the direction of the core support plate 20 in a substantially rectangular-parallelepiped shape and are formed in all the monitor-guide-tube fixing sections 41. Bolt holes (not shown), which are holes piercing the monitor-guide-tube fixing sections 41 in the axial direction of the in-core monitor guide tube 40, are formed in the monitor-guide-tube fixing sections 41. Screw holes (not shown) are formed in positions corresponding to the bolt holes on the surface on the top cover 15 side of the core support plate 20. This makes it possible to fix the monitor-guide-tube fixing sections 41 to the core support plate 20 by inserting bolts 50 into the bolt holes of the monitor-guide-tube fixing sections 41 and screwing the bolts 50 in the screw holes of the core support plate 20.

Recesses 21, which are concavities formed in a shape substantially the same as the shape of the projections 45 and formed in a size slightly larger than the size of the projections 45, are formed in positions corresponding to the projections 45 formed in the monitor-guide-tube fixing sections 41 on the surface on the top cover 15 side of the core support plate 20. Therefore, when the monitor-guide-tube fixing sections 41 are fixed to the core support plate 20, the projections 45 enter the recesses 21. The projections 45 and the recesses 21 fit into each other to be formed as fit-in sections 25. Consequently, when the monitor-guide-tube fixing sections 41 are fixed to the core support plate 20 by the bolts 50, the fit-in sections 25 including the projections 45 and the recesses 21 are fixed. The in-core monitor guide tube 40 formed integrally with the monitor-guide-tube fixing sections 41 by the rib plates 60 is fixed to the core support plate 20. In other words, the in-core monitor guide tube 40 is detachably fixed to the surface on the top cover 15 side of the core support plate 20 by the monitor-guide-tube fixing sections 41.

When both the control-rod guide tube 30 and the in-core monitor guide tube 40 are fixed to the core support plate 20, the rib plates 60 and the monitor-guide-tube fixing sections 41 are spaced apart from the control-rod guide tube 30 and the control-rod-guide-tube fixing sections 31. Specifically, as a positional relation between the control-rod guide tube 30 and the in-core monitor guide tube 40 adjacent to each other, the control-rod guide tube 30 and the in-core monitor guide tube 40 are disposed such that the control-rod guide tube 30 is located between the rib plates 60 adjacent to each other in the peripheral direction of the outer peripheral surface 42 of the in-core monitor guide tube 40 (see FIG. 6).

Tie-plate fixing sections 44 are formed in a position closer to the top cover 15 of the in-core monitor guide tube 40 fixed to the core support plate 20, specifically, a position closer to the top cover 15 than the rib plates 60. The tie-plate fixing sections 44 are formed in four places on the outer peripheral surface 42 of the in-core monitor guide tube 40 and projects in the radial direction of the cylindrical shape, which is the shape of the in-core monitor guide tube 40, from the outer peripheral surface 42. All positions in the axial direction of the cylindrical shape of the tie-plate fixing sections 44 in the four places are the same. Positions in the peripheral direction of the cylindrical shape thereof are substantially the same as the positions where the four rib plates 60 are formed. The tie-plate fixing sections 44 and the rib plates 60 are disposed to overlap each other when the in-core monitor guide tube 40 is viewed in the direction of the core support plate 20 from the top cover 15. Moreover, in the tie-plate fixing sections 44, screw holes (not shown) are formed on surfaces on the opposite side of the surfaces on the rib plates 60 side, that is, surfaces on the top cover 15 side. The tie-plate fixing sections 44 formed in this way are provided in all the in-core monitor guide tubes 40.

Figure 5:
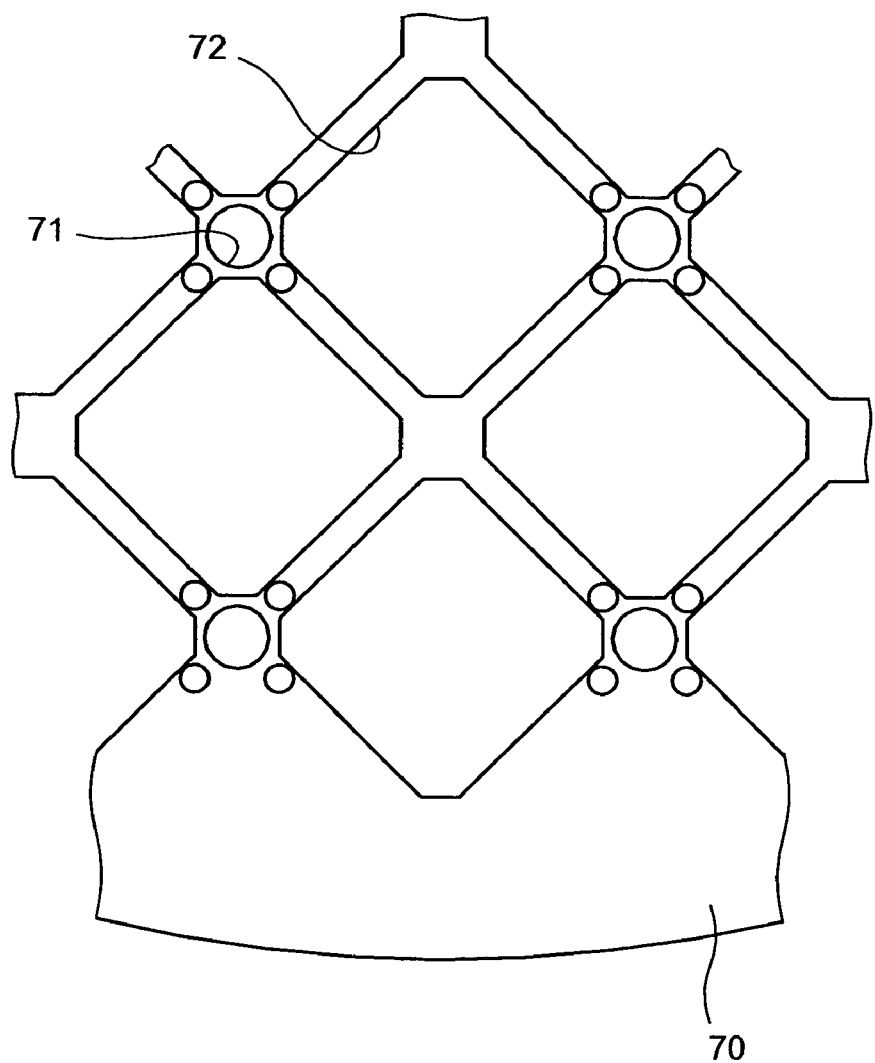
FIG. 5 is an arrow view along D-D in FIG. 2 and an external view of a tie plate unit.

FIG. 5 is an arrow view along D-D in FIG. 2 and is an external view of a tie plate unit. A tie plate 70 serving as a coupling section is fixed to the tie-plate fixing sections 44 included in the in-core monitor guide tubes 40 fixed to the core support plate 20. The tie plate 70 is formed in a tabular shape (i.e., like a plate), a thickness direction of which is the axial direction of the in-core monitor guide tubes 40. A plurality of monitor-guide-tube through-holes 71 serving as through-holes, through which the in-core monitor guide tubes 40 fixed to the core support plate 20 can pass, and a plurality of control-rod-guide-pipe through-holes 72 serving as connecting section through-holes, through which the control rod guide tubes 30 fixed to the core support plate 20 can pass, are formed in the tie plate 70. The monitor-guide-tube through-holes 71 and the control-rod-guide-tube through-holes 72 are formed in positions corresponding to the in-core monitor guide tubes 40 and the control-rod guide tubes 30 fixed to the core support plate 20.

Moreover, a plurality of bolt holes (not shown) serving as holes piercing the tie plate 70 in a thickness direction thereof are formed in the tie plate 70 in positions corresponding to the screw holes of the tie-plate fixing sections 44 provided in the in-core monitor guide tubes 40 fixed to the core support plate 20. The in-core monitor guide tubes 40 passes through the monitor-guide-tube through-holes 71 and the control-rod guide tubes 30 passes through the control-rod-guide-tube through-holes 72. In this state, the tie plate 70 is fixed to the in-core monitor guide tubes 40 by bringing the tie plate 70 into contact the tie-plate fixing sections 44 from the direction of the top cover 15, inserting bolts 75 of the tie plate 70 into the bolt holes of the tie plate 70, and screwing the bolts 75 in screw holes formed in the tie-plate fixing sections 44. By fixing the tie plate 70 to the tie-plate fixing sections 44 in this way, the tie plate 70 is fixed to the in-core monitor guide tubes 40. The tie-plate fixing sections 44 are formed in all the in-core monitor guide tubes 40. The tie plate 70 is fixed to all the in-core monitor guide tubes 40. Consequently, the tie plate 70 couples the in-core monitor guide tubes 40.

The control-rod-guide-tube through-holes 72 are formed such that not only the control-rod guide tubes 30 but also the control-rod-guide-tube fixing sections 31 can pass through the control-rod-guide-tube through-holes 72 in an attachment and detachment direction of the control-rod guide tubes 30 in this state. The attachment and detachment direction is the axial direction of the cylindrical shape, which is the shape of the control-rod guide tubes 30. When the tie plate 70 is viewed in the axial direction of the control-rod guide tubes 30, all sections of the control-rod guide tubes 30 and the control-rod-guide-tube fixing sections 31 are located on the inner side of the control-rod-guide-tube through-holes 72. In other words, the control-rod-guide-tube through-holes 72 are formed such that, when the tie plate 70 is viewed in the axial direction of the control-rod guide tubes 30, all the sections of the control-rod guide tubes 30 and the control-rod-guide-tube fixing sections 31 are located on the inner side of the control-rod-guide-tube through-holes 72.

Figure 6:
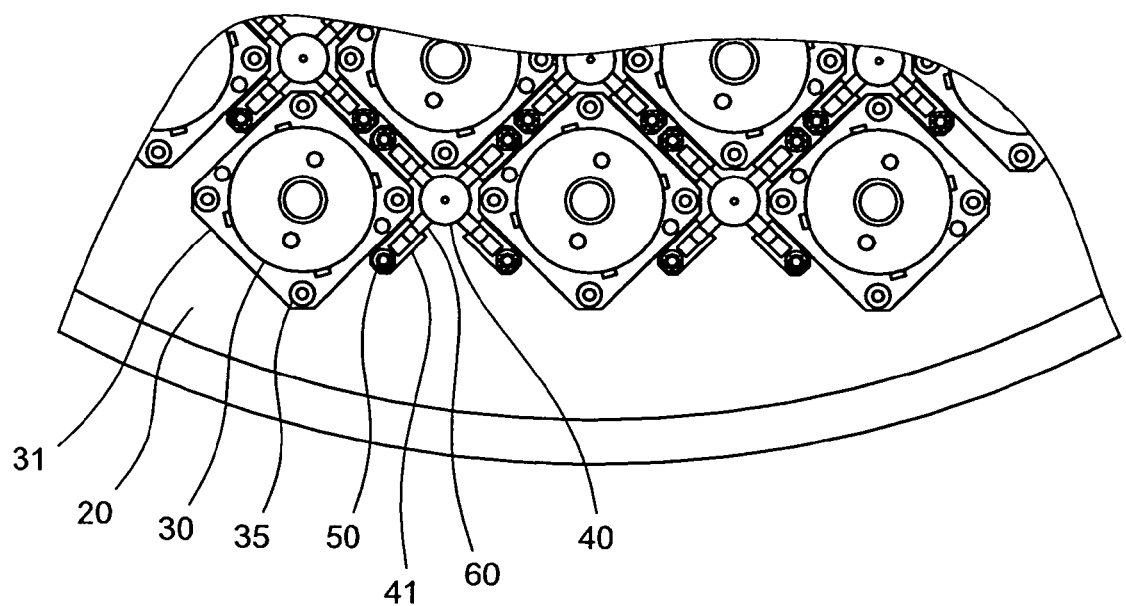
FIG. 6 is a sectional view along E-E in FIG. 2.

Actions of the in-core-monitor-guide-tube supporting apparatus 10 are explained below. FIG. 6 is a sectional view along E-E in FIG. 2. In assembling the reactor vessel 1, the monitor-guide-tube fixing sections 41 formed integrally with the in-core monitor guide tubes 40 by the rib plates 60 are fixed to the surface on the top cover 15 side of the core support plate 20. In that case, since the fit-in sections 25 including the projections 45 and the recesses 21 are formed in the monitor-guide-tube fixing sections 41 and the core support plate 20, the projections 45 formed in the monitor-guide-tube fixing sections 41 are fit in the recesses 21 formed in the core support plate 20. When the projections 45 are fit in the recesses 21, positions of the bolt holes formed in the monitor-guide-tube fixing sections 41 and positions of the screw holes formed in the core support plate 20 coincide with each other. Thus, the bolts 50 are screwed in the screw holes in this state to fix the in-core monitor guide tubes 40 to the core support plate 20.

In fixing the control-rod guide tubes 30 to the core support plate 20, the control-rod-guide-tube fixing sections 31 fixed to the control-rod guide tubes 30 are fixed to the surface on the top cover 15 side of the core support plate 20 by the bolts 35. Consequently, the control-rod guide tubes 30 are fixed to the core support plate 20. The control-rod guide tubes 30 fixed to the core support plate 20 in this way are disposed between the rib plates 60 provided on the in-core monitor guide tubes 40 adjacent to each other.

The control-rod guide tubes 30 disposed in this way are disposed in a direction in which sides of the control-rod-guide-tube fixing sections 31 formed by the substantially rectangular flanges and the rib plates 60 are substantially parallel to each other. When the in-core monitor guide tubes 40 are viewed in the axial direction of the cylindrical shape, which is the shape of the in-core monitor guide tubes 40, the four rib plates 60 are disposed to form a cross shape. The control-rod-guide-tube fixing sections 31 have the substantially rectangular shape. Thus, the control-rod guide tubes 30 are disposed in a direction in which the sides of the control-rod-guide-tube fixing sections 31 are parallel to the rib plates 60 and a corner section between two sides of the control-rod-guide-tube fixing sections 31 is opposed to the outer peripheral surface 42 located between two rib plates 60 in the in-core monitor guide tube 40.

Figure 7:
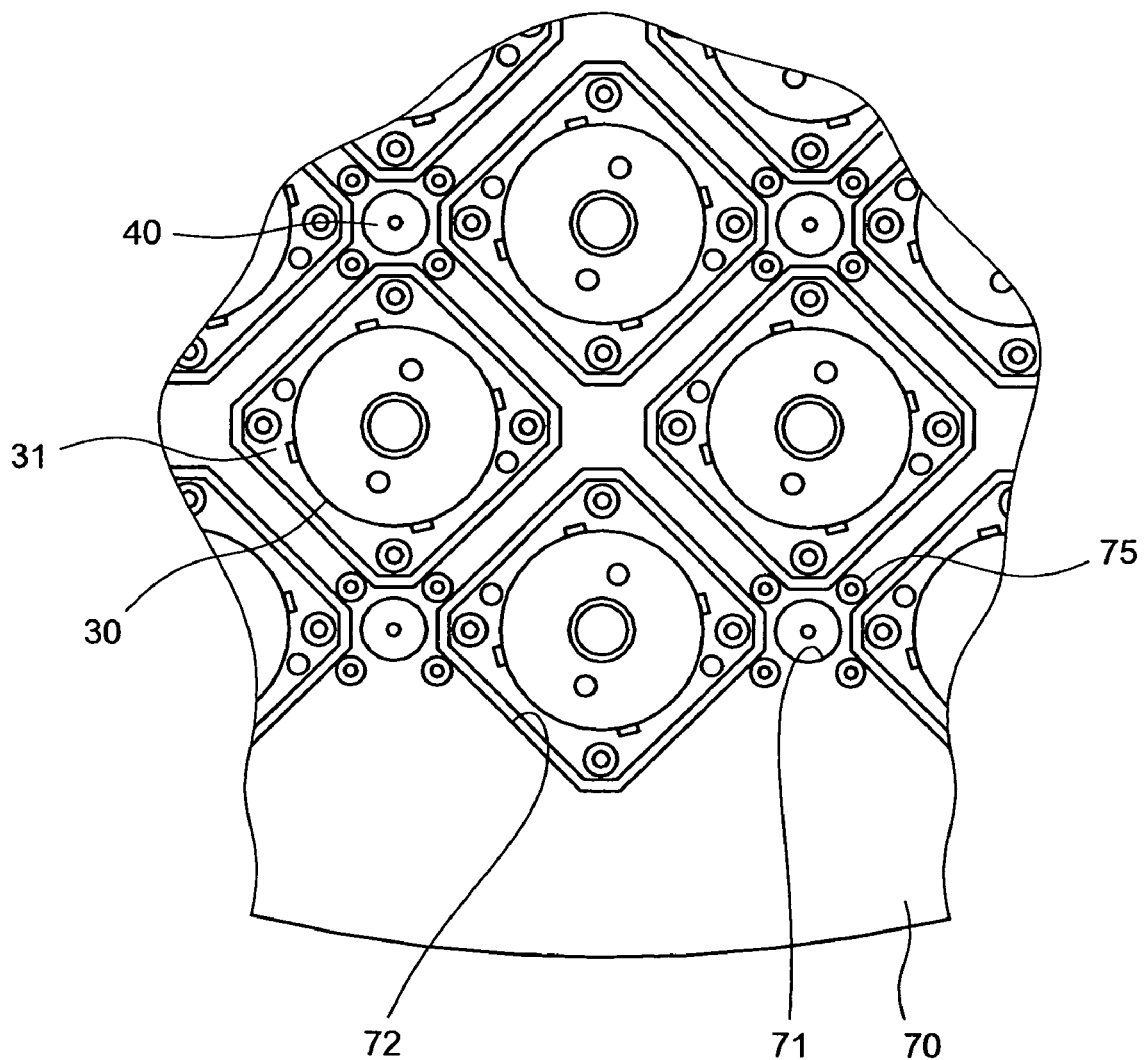
FIG. 7 is an arrow view along D-D in FIG. 2 and is a diagram of a state in which tie plates, in-core monitor guide tubes, and control-rod guide tubes are assembled.

FIG. 7 is an arrow view along D-D in FIG. 2 and is a diagram of a state in which tie plates, in-core monitor guide tubes, and control-rod guide tubes are assembled. The in-core monitor guide tubes 40 and the control-rod guide tubes 30 are fixed to the core support plate 20. The tie plate 70 is fixed to the in-core monitor guide tubes 40, in which the tie-plate fixing sections 44 are provided, by the bolts 75. Since the tie plate 70 is fixed to all the in-core monitor guide tubes 40, the in-core monitor guide tubes 40 are coupled to one another and integrally formed by the tie plate 70. Light water also serving as a moderator and a coolant is filled in the reactor vessel 1 in which the in-core monitor guide tubes 40 and the control-rod guide tubes 30 are disposed in this way.

In removing the control-rod guide tubes 30 disposed in the reactor vessel 1 from the core support plate 20, the bolts 35 are untightened. Thereafter, the in-core monitor guide tubes 40 are fixed to the core support plate 20 and the tie plate 70 is fixed to the in-core monitor guide tubes 40. In this state, the control-rod guide tubes 30 are pulled out upward, that is, in a direction opposite to the direction in which the core support plate 20 is provided. The tie plate 70 is located in this direction. However, the control-rod-guide-tube through-holes 72, which are formed by through-holes larger than the control-rod guide tubes 30 and the control-rod-guide-tube fixing sections 31, are formed in the tie plate 70. Thus, it is possible to pull out the control-rod guide tubes 30 from the control-rod-guide-tube through-holes 72.

When a reactor including the reactor vessel 1 is operated, the light water in the reactor vessel 1 circulates in the reactor vessel 1 and outside the reactor vessel 1. Therefore, the light water flows inside the reactor vessel 1. A load acts on the in-core monitor guide tubes 40 because of the flow of the light water. The flow of the light water changes according to adjustment or the like of an output of the reactor. Thus, a fluctuating load acts on the in-core monitor guide tubes 40 because of the change in the flow of the light water.

In the in-core-monitor-guide-tube supporting apparatus 10, the in-core monitor guide tubes 40 provided in the reactor vessel 1 are fixed to the monitor-guide-tube fixing sections 41 by the rib plates 60 to be formed integrally with the monitor-guide-tube fixing sections 41. In fixing the in-core monitor guide tubes 40 to the core support plate 20, the monitor-guide-tube fixing sections 41 are fixed to the surface on the top cover 15 side of the core support plate 20. This makes it possible to improve rigidity of connecting portions of the monitor-guide-tube fixing sections 41 and the in-core monitor guide tubes 40, which are portions where the in-core monitor guide tubes 40 are fixed to the core support plate 20. This also makes it possible to improve rigidity of portions where the in-core monitor guide tubes 40 are fixed to the core support plate 20. The tie plate 70 located further on the top cover 15 side than the rib plates 60 is fixed to all the in-core monitor guide tubes 40 disposed in the reactor vessel 1. The in-core monitor guide tubes 40 are coupled by the tie plate 70. Consequently, since the in-core monitor guide tubes 40 are integrated, it is possible to realize improvement of rigidity of the in-core monitor guide tubes 40 as a whole.

A portion in the direction of the top cover 15 of the in-core monitor guide tubes 40 is referred as an upper portion and a portion in the direction of the core support plate 20 is referred to as a lower portion. Upper portions of the in-core monitor guide tubes 40 are fixed by the tie plate 70 and lower portions thereof are reinforced by the rib plates 60. Thus, the in-core monitor guide tubes 40 are fixed in the upper portions and the lower portions. Therefore, rigidity of the in-core monitor guide tubes 40 as a whole is improved. In this way, the in-core monitor guide tubes 40 are disposed in the reactor vessel 1 in the state of high rigidity. Thus, even when the light water in the reactor vessel 1 flows during the operation of the reactor and a fluctuating load acts on the in-core monitor guide tubes 40 because of the flow of the light water, it is possible to prevent the in-core monitor guide tubes 40 from being vibrated excessively by the fluctuating load. Similarly, even when vibration due to external factors such as an earthquake is transmitted to the reactor vessel 1 during the operation of the reactor, since the in-core monitor guide tubes 40 are disposed in the reactor vessel 1 in the state of high rigidity, it is possible to prevent the in-core monitor guide tubes 40 from being vibrated excessively by the vibration. As a result, it is possible to realize vibration damping for the in-core monitor guide tubes 40.

The fit-in sections 25 including the recesses 21 and the projections 45 are provided in the monitor-guide-tube fixing sections 41 and the core support plate 20. Thus, in fixing the in-core monitor guide tubes 40 to the core support plate 20 with the monitor-guide-tube fixing sections 41, it is possible to easily position the monitor-guide-tube fixing sections 41 by fitting the projections 45 into recesses 21. This makes it possible to easily assemble the in-core monitor guide tubes 40 to the core support plate 20. As a result, it is possible to realize improvement of maintainability. In fixing the in-core monitor guide tube 40 to the core support plate 20, since the fit-in sections 25 are fit in, it is possible to fix the in-core monitor guide tubes 40 in more accurate positions. As a result, it is possible to realize improvement of position accuracy of the in-core monitor guide tubes 40. In other words, since the fit-in sections 25 including the recesses 21 and the projections 45 are provided in the monitor-guide-tube fixing sections 41 and the core support plate 20, it is possible to easily and accurately assemble the in-core monitor guide tubes 40 to the core support plate 20.

The control-rod guide tubes 30 adjacent to the in-core monitor guide tubes 40 are disposed to be located between the monitor-guide-tube fixing sections 41 and the rib plates 60 or the monitor-guide-tube fixing sections 41 and the rib plates 60 are formed to be located on both the sides of the control-bar guide tubes 30. Consequently, the monitor-guide-tube fixing sections 41 and the rib plates 60 are spaced apart from the control-rod guide tubes 30 and the control-rod-guide-tube fixing sections 31. Consequently, in attaching and detaching the control-rod guide tubes 30 to and from the core support plate 20, it is possible to attach and detach the control-rod guide tubes 30 to and from the core support plate 20 without removing the in-core monitor guide tubes 40 from the core support plate 20. As a result, it is possible to realize improvement of maintainability.

The control-rod-guide-tube through-holes 72, through which the control-rod guide tubes 30 and the control-rod-guide-tube fixing sections 31 can pass, are formed in the tie plate 70. Thus, in attaching and detaching the control-rod guide tubes 30 to and from the core support plate 20, it is possible to more surely and easily attach and detach the control-rod guide tubes 30. As a result, it is possible to more surely realize improvement of maintainability.

The tie plate 70 that couples the in-core monitor guide tubes 40 is only fixed to the in-core monitor guide tubes 40 and is not fixed to the reactor vessel 1. This makes it possible to control deficiencies such as damages to the in-core monitor guide tubes 40 due to a temperature change at the time of operation of the reactor. In other words, since a material of the reactor vessel 1 and a material of the in-core monitor guide tubes 40 are different, coefficients of thermal expansion thereof are different. Consequently, when temperature changes occur in the reactor vessel 1 and the in-core monitor guide tubes 40 at the time of operation of the reactor, even if the temperature changes of the reactor vessel 1 and the in-core monitor guide tubes 40 are identical, a difference of thermal expansion occurs between the reactor vessel 1 and the in-core monitor guide tubes 40 because the coefficients of thermal expansion are different. Therefore, when the in-core monitor guide tubes 40 are fixed to the reactor vessel 1, it is likely that the in-core monitor guide tubes 40 having low rigidity are damaged because of the difference in thermal expansion. Thus, the tie plate 70 is not fixed to the reactor vessel 1 but is connected to only the in-core monitor guide tubes 40. This makes it possible to change the length in the top cover 15 direction of the in-core monitor guide tubes 40 and change the lengths of the reactor vessel 1 and the in-core monitor guide tubes 40 independently from each other. Therefore, it is possible to absorb a different of thermal expansion of the reactor vessel 1 and the in-core monitor guide tubes 40 when temperature changes occur in the reactor vessel 1 and the in-core monitor guide tubes 40. As a result, it is possible to control deficiencies such as damage to the in-core monitor guide tubes 40 due to a temperature change at the time of reactor operation.

Figure 8:
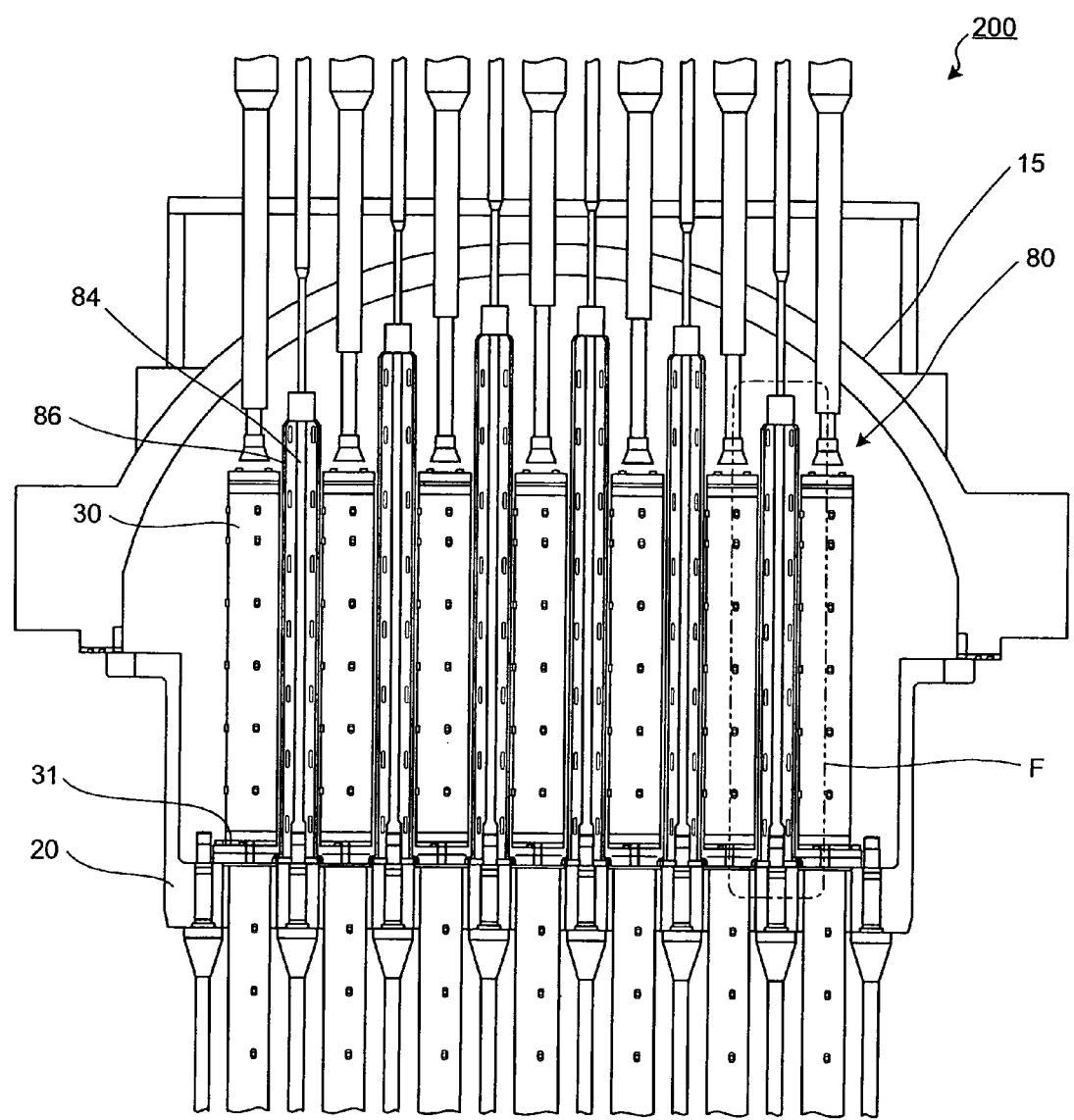
FIG. 8 is a schematic of relevant parts of a reactor vessel that includes an in-core-monitor-guide-tube supporting apparatus according to a second embodiment of the present invention.
Figure 9:
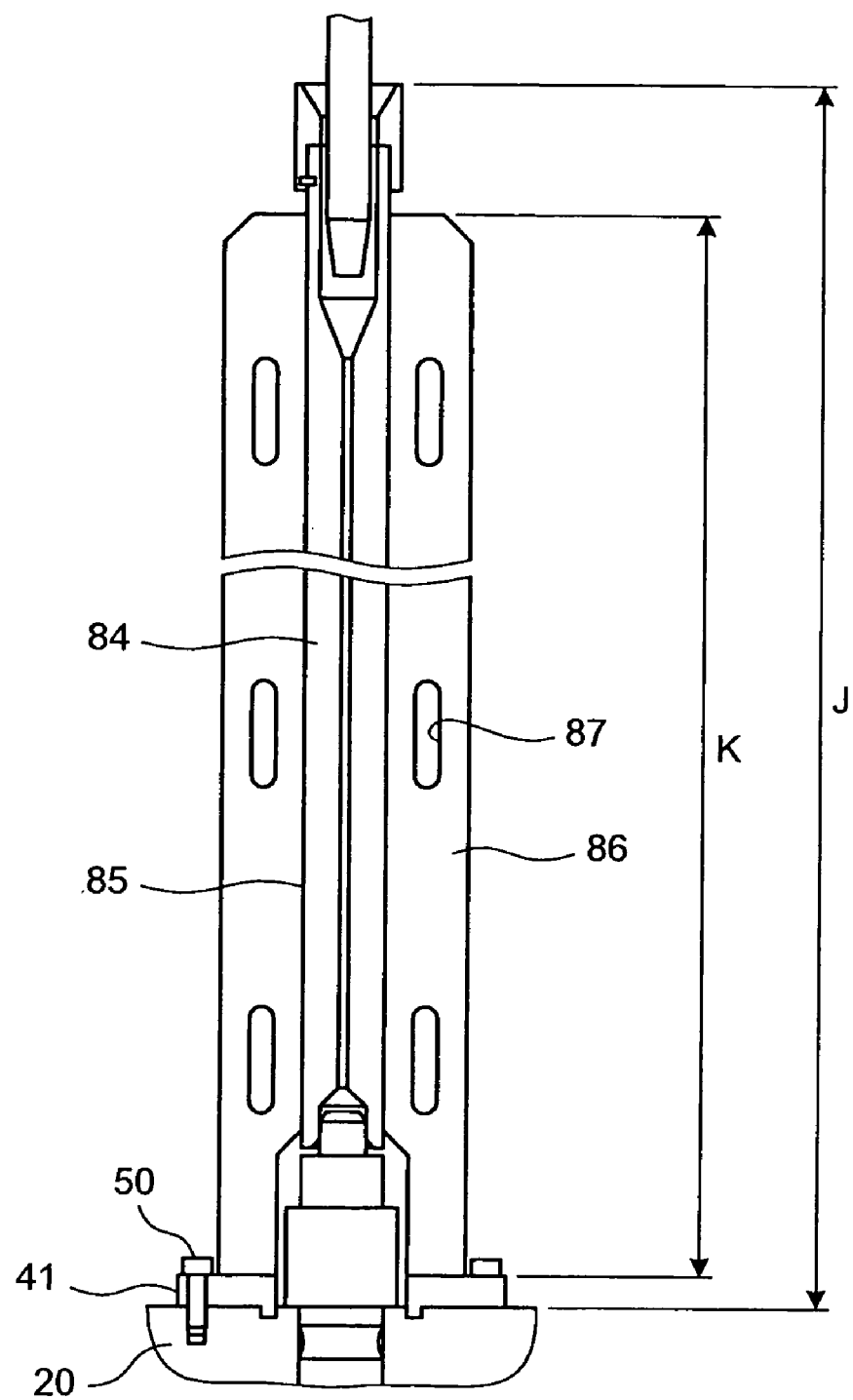
FIG. 9 is a detailed view of a section F in FIG. 8.

An in-core-monitor-guide-tube supporting apparatus according to a second embodiment of the present invention has substantially the same structure as the in-core-monitor-guide-tube supporting apparatus 10. The in-core-monitor-guide-tube supporting apparatus according to the second embodiment is characterized in that rigidity of in-core monitor guide tubes is secured by rib plates. Since the other components are the same as those in the first embodiment, explanations of the components are omitted and the components are denoted by the identical reference numerals and signs. FIG. 8 is a schematic of relevant parts of a reactor vessel 200 that includes a in-core-monitor-guide-tube supporting apparatus 80 according to the second embodiment. FIG. 9 is a detailed diagram of a portion F in FIG. 8. In an in-core-monitor-guide-tube supporting apparatus 80, as in the in-core-monitor-guide-tube supporting apparatus 10, in-core monitor guide tubes 84 are fixed to the core support plate 20 disposed in the reactor vessel 200. Rib plates 86 serving as reinforcing sections are connected to outer peripheral surfaces 85 of the in-core monitor guide tubes 84. In the in-core-monitor-guide-tube supporting apparatus 80, unlike the in-core-monitor-guide-tube supporting apparatus 10, a tie plate is not provided.

Like the rib plates 60 connected to the in-core monitor guide tube 40 included in the in-core-monitor-guide-tube supporting apparatus 10, four rib plates 86 are connected to the outer peripheral surface 85 of the in-core monitor guide tube 84 and project outward in a radial direction of the in-core monitor guide tube 84. The rib plates 86 integrally fix the monitor-guide-tube fixing sections 41 to the in-core monitor guide tube 84. Length in a radial direction of a cylindrical shape, which is a shape of the in-core monitor guide tube 84, is set larger than the length in the same direction of the rib plates 60 connected to the in-core monitor guide tube 40 included in the in-core-monitor-guide-tube supporting apparatus 10.

Specifically, when the axial direction of the cylindrical shape, which is the shape of the in-core monitor guide tube 84, is set as a length direction, the rib plates 86 are formed such that length K of the rib plates 86 is within 50% to 100% of a total length J in the length direction of the in-core monitor guide tube 84 and the monitor-guide-tube fixing sections 41 integrally fixed.

Drain holes 87 serving as reinforced portion through-holes, which pierce the rib plates 86, are also formed in the rib plates 86. The drain holes 87 are formed in a shape of long holes, a longitudinal direction of which is the length direction of the in-core monitor guide tube 84. For one rib plate 86, a plurality of drain holes 87 are arranged in the length direction in the in-core monitor guide tube 84.

Actions of the in-core-monitor-guide-tube supporting apparatus 80 are explained below. Light water also serving as a moderator and a coolant is filled in the reactor vessel 200. In the reactor vessel 200 in which the light water is filled, a plurality of in-core monitor guide tubes 84 are disposed. A plurality of rib plates 86 having a length larger than that of the rib plates 60 connected to the in-core monitor guide tubes 40 included in the in-core-monitor-guide-tube supporting apparatus 10 are connected to the in-core monitor guide tubes 84. Therefore, the control-rod guide tubes 30 adjacent to the in-core monitor guide tubes 84 are surrounded by the rib plates 86 adjacent to one another. The periphery of the control-rod guide tubes 30 surrounded by the rib plates 86 is nearly closed by the rib plates 86. The drain holes 87 are formed in the rib plates 86 formed in this way. The control-rod guide tubes 30 may vibrate at the time of operation of the reactor. However, when the control-rod guide tubes 30 vibrate, since the drain holes 87 are formed in the rib plates 86, the light water around the control-rod guide tubes 30, to which the vibration of the control-rod guide tubes 30 is transmitted, passes through the drain holes 87 and flows out from a space around the control-rod guide tubes 30.

In the in-core-monitor-guide-tube supporting apparatus 80, as in the in-core monitor guide tubes 40 included in the in-core-monitor-guide-tube supporting apparatus 10, the rib plates 86 are connected to the in-core monitor guide tubes 84. The monitor-guide-tube fixing sections 41 and the in-core monitor guide tubes 84 are integrally formed by the rib plates 86. The monitor-guide-tube fixing sections 41 formed integrally with the in-core monitor guide tubes 84 by the rib plates 86 is fixed to the core support plate 20 to fix the in-core guide tubes 84 to the core support plate 20. The length K of the rib plates 86 in the length direction of the in-core monitor guide tubes 84 is within the range of 50% to 100% of the total length J of the in-core core monitor guide tubes 84 and the monitor-guide-tube fixing sections 41 integrally formed. Therefore, it is possible to improve rigidity of not only portions of the in-core monitor guide tubes 84 fixed to the core support plate 20 but also the entire in-core monitor guide tubes 84. Therefore, when the light water in the reactor vessel 200 flows, for example, even if a fluctuating load is transmitted to the in-core monitor guide tubes 84 or even if an earthquake occurs, it is possible to prevent the in-core monitor guide tubes 84 from being vibrated excessively by vibration due to these causes. As a result, it is possible to realize vibration damping for the in-core monitor guide tubes 84.

Since the drain holes 87 piercing the rib plates 86 are formed in the rib plates 86, it is possible to cause the light water around the rib plates 86 to flow through the drain holes 87. This makes it possible to realize vibration damping for the control-rod guide tubes 30. The length of the rib plates 86 is larger than the length of the rib plates 60 connected to the in-core monitor guide tubes 40 included in the in-core-monitor-guide-tube supporting apparatus 10. This makes it easy for the rib plates 86 adjacent to each other to close the outer side of the control-rod guide tubes 30. In other words, since the length of the rib plates 86 is increased, it is easy to close the space around the control-rod guide tubes 30 surrounded by the rib plates 86. When the space around the control-rod guide tubes 30 is closed, as the closed space becomes smaller, a fluid-structural interaction (FSI) effect tends to increase. When the FSI effect increases, a fluid load mass applied to the control-rod guide tubes 30 increases.

Specifically, in a state in which the control-rod guide tubes 30 are provided in the closed space, when the control-rod guide tubes 30 vibrate, the light water around the control-rod guide tubes 30 pushed away by the vibration can less easily escape. Thus, the fluid load mass applied to the control-rod guide tubes 30 increases. When the fluid load mass increases, it is likely that the fluid load mass affects a vibration characteristic of the control-rod guide tubes 30 and causes a fall in a characteristic frequency and an increase in amplitude to damage the control-rod guide tubes 30. Thus, the drain holes 87 are formed in the rib plates 86. This allows the light water around the-control-rod guide tubes 30 to escape from the closed space around the control-rod guide tubes 30 through the drain holes 87 when the control-rod guide tubes 30 vibrate. Consequently, it is possible to reduce the FSI effect and, even when the length of the rib plates 86 is increased, reduce the influence on the vibration characteristic of the control-rod guide tubes 30. As a result, it is possible to realize vibration damping for the control-rod guide tubes 30.

Figure 10:
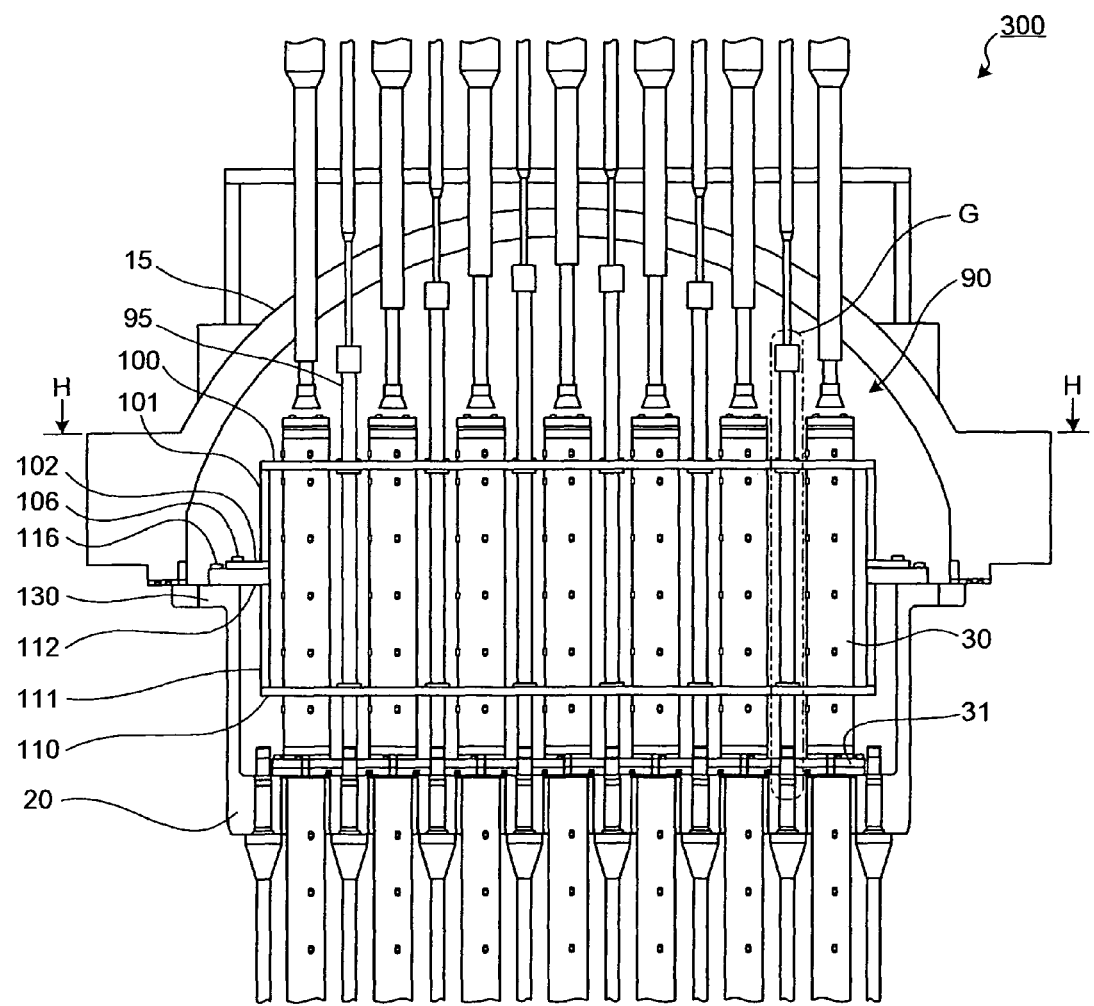
FIG. 10 is a schematic of relevant parts of a reactor vessel that includes an in-core-monitor-guide-tube supporting apparatus according to a third embodiment of the present invention.

An in-core-monitor-guide-tube supporting apparatus according to a third embodiment of the present invention has substantially the same structure as the in-core-monitor-guide-tube supporting apparatus 10. The in-core-monitor-guide-tube supporting apparatus according to the third embodiment is characterized in that a plurality of in-core monitor guide tubes are integrally formed by a plurality of tie plates to secure rigidity of the entire in-core monitor guide tubes. Since the other components are the same as those in the first embodiment, explanations of the components are omitted and the components are denoted by the identical reference numerals and signs. FIG. 10 is a schematic of a main part of a reactor vessel 300 that includes the in-core-monitor-guide-tube supporting apparatus 90 according to the third embodiment of the present invention. In the in-core-monitor-guide-tube supporting apparatus 90, as in the in-core-monitor-guide-tube supporting apparatus 10, a plurality of in-core monitor guide tubes 95 disposed in the reactor vessel 300 are coupled by tie plates. In the in-core-monitor-guide-tube supporting apparatus 90 according to the third embodiment, unlike the in-core-monitor-guide-tube supporting apparatus 10, monitor-guide-tube fixing sections are not provided.

The in-core monitor guide tubes 95 are coupled by a plurality of tie plates serving as coupling sections. The in-core monitor guide tubes 95 are coupled by an upper tie plate 100 located closer to the top cover 15 in a length direction of the in-core monitor guide tubes 95 and a lower tie plate 110 located closer to the core support plate 20. An upper-tie-plate rib 101 is connected to an end of the upper tie plate 110, that is, an end in an outer side direction in a radial direction of the cylindrical body that forms the reactor vessel 300 together with the top cover 15 and the bottom mirror. The upper-tie-plate rib 101 has a tabular shape formed from the upper tie plate 100 to the core support plate 20. Moreover, upper-tie-plate flanges 102 are connected to an end in the direction of the core support plate 20 of the upper-tie-plate rib 101. The upper-tie-plate flanges 102 are formed from an end on the core support plate 20 side of the upper-tie-plate rib 101 to the outer side direction in the radial direction of the cylindrical body.

A lower-tie-plate rib 111 is connected to an end of the lower tie plate 110, that is, an end in the outer side direction in the radial direction of the cylindrical body. The lower-tie-plate rib 111 has a tabular shape formed from the lower tie plate 110 to the top cover 15. Lower-tie-plate flanges 112 are connected to an end in the top cover 15 direction of the lower-tie-plate rib 111. The lower-tie-plate flanges 112 are formed from an end on the top cover 15 side of the lower-tie-plate rib 111 to the outer side direction in the radial direction of the cylindrical body.

The upper-tie-plate flanges 102 and the lower-tie-plate flanges 112 are connected by bolts 106 to integrally form the upper tie plate 100 and the lower tie plate 110. Positions of the upper-tie-plate rib 101 and the lower-tie-plate rib 111 in the radial direction of the cylindrical body are substantially the same. An end outward in the radial direction of the cylindrical body in the lower-tie-plate flanges 112 is set larger than an end outward in the radial direction of the cylindrical body in the upper-tie-plate flanges 102. The upper-tie-plate flanges 102 formed in this way are in contact with the lower-tie-plate flanges 112 from the direction of the top cover 15 and fixed to the lower-tie-plate flanges 112 by the bolts 106.

The core support plate 20 provided in the reactor vessel 300 has core-support-plate flanges 130 in the direction of the top cover 15. The core-support-plate flanges 130 are in contact with the top cover 15. Positions where the core-support-plate flanges 130 are provided are near positions where the lower-tie-plate flanges 112 are provided in the length direction of the in-core monitor guide tube 95. The lower-tie-plate flanges 112 are in contact with surfaces on the top cover 15 side of the core-support-plate flanges 130. The lower-tie-plate flanges 112 are fixed to the core-support-plate flanges 130 by bolts 116 in this state. The core-support-plate flanges 130, to which the lower-tie-plate flanges 112 are fixed in this way, are fixed to the reactor vessel 300.

Figure 11:
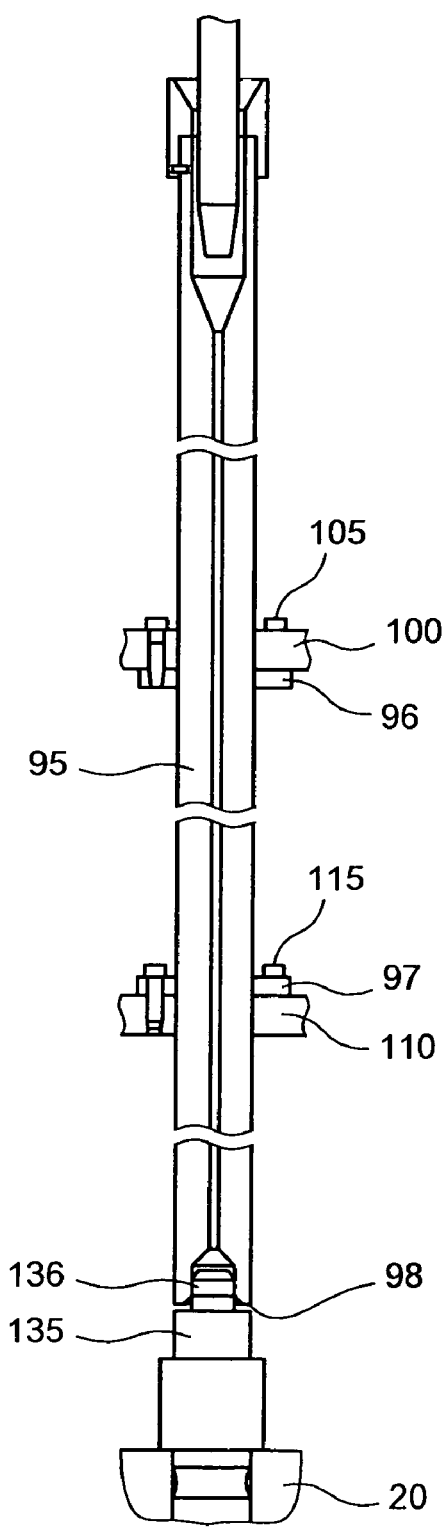
FIG. 11 is a detailed view of a section G in FIG. 10.

FIG. 11 is a detailed view of a section G in FIG. 10. In the in-core monitor guide tube 95, tie-plate fixing sections, which have the same shape as the tie-plate fixing section 44 formed in the in-core monitor guide tube 40 included in the in-core-monitor-guide-tube supporting apparatus 10, are formed in two places in the length direction of the in-core monitor guide tube 95. The tie-plate fixing section located closer to the top cover 15 in the length direction is an upper-tie-plate fixing section 96. The tie-plate fixing section located closer to the core support plate 20 is a lower-tie-plate fixing section 97. The upper tie plate 100 is in contact with the upper-tie-plate fixing section 96 from a surface on the top cover 15 side of the upper-tie-plate fixing section 96 and fixed to the upper-tie-plate fixing section 96 by bolts 105. The lower tie plate 110 is in contact with the lower-tie-plate fixing section 97 from a surface on the core support plate 20 side of the lower-tie-plate fixing section 97 and fixed to the lower-tie-plate fixing section 97 by bolts 115.

In the core support plate 20, an attaching member 135 is provided on a surface on the top cover 15 side in a position where the in-core monitor guide tube 95 is provided. The attaching member 135 has an attaching-member fitting section 136, which has a substantially columnar shape and is convex in the direction of the top cover 15, in an upper end portion thereof. The attaching-member fitting section 136 is inserted into the in-core monitor guide tube 95 from a lower end 98 of the in-core monitor guide tube 95 and fit in the in-core monitor guide tube 95. The lower end 98 of the in-core monitor guide tube 95 is spaced apart from the attaching member 135. In other words, the in-core monitor guide tube 95 is fit in the attaching-member fitting section 136 with the lower end 98 thereof spaced apart from the attaching member 135.

Figure 12:
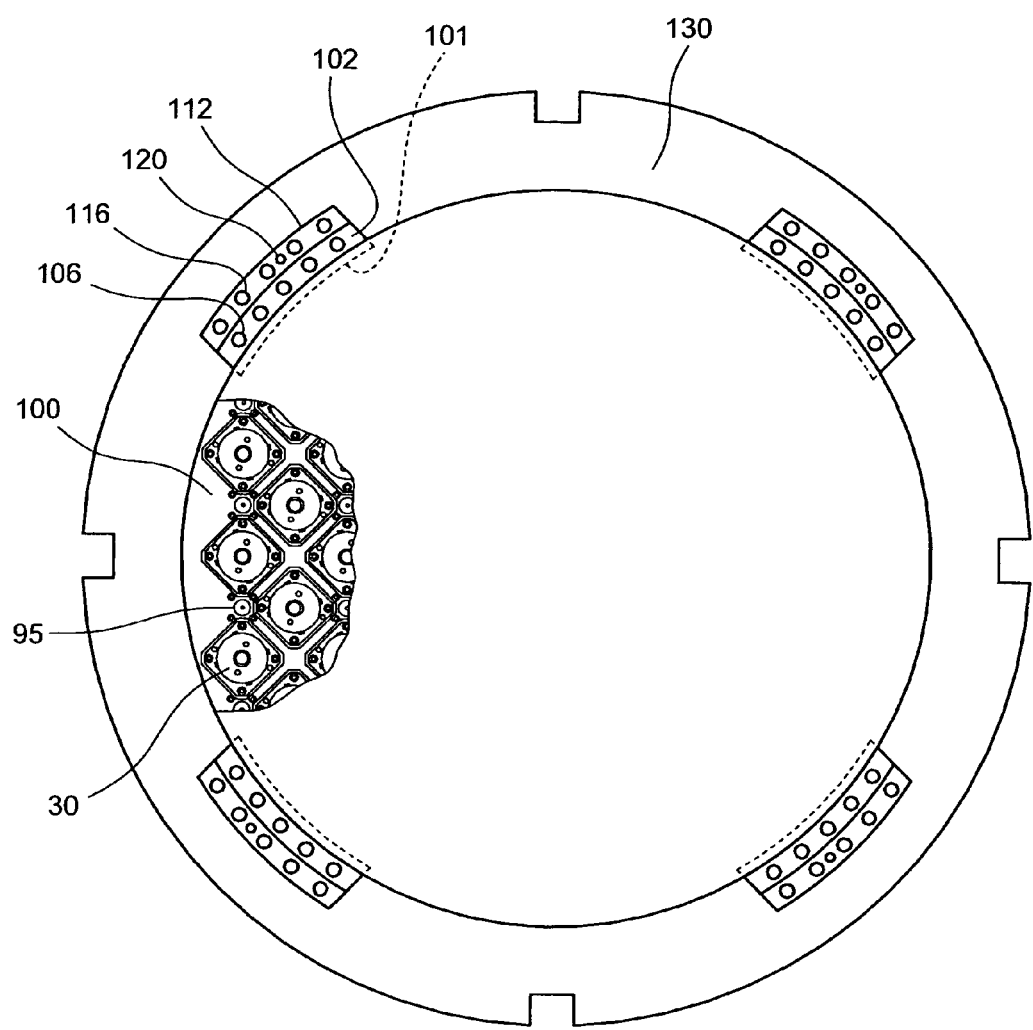
FIG. 12 is an arrow view along H-H in FIG. 10.

FIG. 12 is an arrow view along H-H in FIG. 10. Four upper-tie-plate flanges 102 and four lower-tie-plate flanges 112 are formed and disposed in four places at equal intervals in the peripheral direction of the cylindrical body. In other words, four sets of the upper-tie-plate flanges 102 and the lower-tie-plate flanges 112 are disposed in the four places in the peripheral direction of the cylindrical body.

The upper-tie-plate flanges 102 are fixed to the lower-tie-plate flanges 112 by five bolts 106 for each set of the upper-tie-plate flanges 102 and the lower-tie-plate flanges 112. The lower-tie-plate flanges 112 are fixed to the core-support-plate flanges 130 by five bolts 116 for each of the lower-tie-plate flanges 112. Moreover, joint pins 120 are provided near the positions where the lower-tie-plate flanges 112 are fixed in the core-support-plate flanges 130. It is possible to position the lower-tie-plate flanges 112 by inserting the joint pins 120 into the lower-tie-plate flanges 112.

As in the tie plate 70 included in the in-core-monitor-guide-tube supporting apparatus 10, monitor-guide-tube through-holes (not shown) and control-rod-guide-tube through-holes (not shown) are formed in the upper tie plate 100 and the lower tie plate 110, respectively.

Actions of the in-core-monitor-guide-tube supporting apparatus 90 are explained. Light water also serving as a moderator and a coolant is filled in the reactor vessel 300. The light water flows inside the reactor vessel 300 at the time of operation of a reactor including the in-core-monitor-guide-tube supporting apparatus 90 according to the third embodiment. A plurality of in-core monitor guide tubes 95 are disposed in the reactor vessel 300 in which the light water flows. The upper tie plate 100 and the lower tie plate 110 are fixed in all the in-core monitor guide tubes 95. In other words, the in-core monitor guide tubes 95 are coupled by the upper tie plate 100 and the lower tie plate 110 serving as coupling sections.

The upper-tie-plate flanges 102 and the lower-tie-plate flanges 112 are fixed by the bolts 106 to integrally fix the upper tie plate 100 and the lower tie plate 110. The lower tie plate 110 is fixed to the core-support-plate flanges 130 by the bolts 116 to fix the upper tie plate 100 and the lower tie plate 110, which are integrally fixed, to the reactor vessel 300. In other words, since the core-support-plate flanges 130 are fixed to the reactor vessel 300, the upper tie plate 100 and the lower tie plate 110 are fixed to indirectly fix the in-core monitor guide tubes 95 to the reactor vessel 300 via the upper tie plate 100 and the lower tie plate 110. Therefore, even when the light water in the reactor vessel 300 flows and a load acts on the in-core monitor guide tubes 95 because of the flow, the in-core monitor guide tubes 95 can receive the load without being deformed or moving.

In the in-core-monitor-guide-tube supporting apparatus 90, the upper tie plate 100 and the lower tie plate 110 are fixed to the in-core monitor guide tubes 95. The in-core monitor guide tubes 95 are coupled by the upper tie plate 100 and the lower tie plate 110. Moreover, the lower tie plate 110 is fixed to the core-support-plate flanges 130 to indirectly fix the in-core monitor guide tubes 95 to the reactor vessel 300. This makes it possible to fix the in-core monitor guide tubes 95 to the reactor vessel 300 in a state in which the in-core monitor guide tubes 95 are integrated. This also makes it possible to fix the in-core monitor guide tubes 95 to the reactor vessel 300 in a state in which rigidity of the in-core monitor guide tubes 95 as a whole is improved. Therefore, when the light water in the reactor vessel 300 flows, for example, even if a fluctuating load is transmitted to the in-core monitor guide tubes 95 or even if an earthquake occurs, it is possible to prevent the in-core monitor guide tubes 95 from being vibrated excessively by vibration due to these causes. As a result, it is possible to realize vibration damping for the in-core monitor guide tubes 95.

The upper tie plate 100 and the lower tie plate 110 are fixed to the in-core monitor guide tubes 95 in a plurality of different positions in the length direction of the in-core monitor guide tubes 95. Thus, the in-core monitor guide tubes 95 are coupled by the upper tie plate 100 and the lower tie plate 110. This makes it possible to more surely realize improvement of rigidity of the entire in-core monitor guide tubes 95. As a result, it is possible to more surely realize vibration damping for the in-core monitor guide tubes 95.

Control-rod-guide-tube through-holes, through which the control-rod guide tubes 30 and the control-rod-guide-tube fixing sections 31 can pass, are formed in the upper tie plate 100 and the lower tie plate 110. Consequently, even when the control-rod guide tubes 30 are disposed in the reactor vessel 300, in attaching or detaching the control-rod guide tubes 30 to and from the core support plate 20, it is possible to more surely attach and detach the control-rod guide tubes 30. As a result, it is possible to more surely realize improvement of maintainability.

The upper tie plate 100 and the lower tie plate 110 are fixed to the in-core monitor guide tubes 95 to fix the in-core monitor guide tubes 95. This makes it possible to integrally form the in-core monitor guide tubes 95 by the upper tie plate 100 and the lower tie plate 110 outside the reactor vessel 300 and, then, build the in-core monitor guide tubes 95 in the reactor vessel 300. As a result, it is possible to easily assemble the in-core monitor guide tubes 95 and more surely realize improvement of maintainability.

The attaching-member fitting section 136 included in the attaching member 135 provided in the core support plate 20 is fit in the in-core monitor guide tube 95. The lower end 98 of the in-core monitor guide tube 95 is spaced apart from the attaching member 135. This makes it possible to control deficiencies such as damage to the in-core monitor guide tubes 40 due to a temperature change at the time of reactor operation. In the in-core-monitor-guide-tube supporting apparatus 90 according to the third embodiment, as in the in-core-monitor-guide-tube supporting apparatus 10, coefficients of thermal expansion of the reactor vessel 300 and the in-core monitor guide tube 95 are different. Thus, a difference of thermal expansion may occur between the reactor vessel 300 and the in-core monitor guide tube 95 at the time of operation of the reactor. Therefore, when the in-core monitor guide tube 95 is fixed to the reactor vessel 300, it is likely that the in-core monitor guide tube 95 having low rigidity is damaged by the difference of thermal expansion. However, it is possible to change length of the reactor vessel 300 and the in-core monitor guide tube 95 independently by spacing the lower end 98 of the in-core monitor guide tube 95 apart from the attaching member 135. Therefore, when a temperature change occurs in the reactor vessel 300 and the in-core monitor guide tube 95, it is possible to absorb a difference of thermal expansion of the reactor vessel 300 and the in-core monitor guide tube 95 in the space between the lower end 98 of the in-core monitor guide tube 95 and the attaching member 135. As a result, it is possible to control deficiencies such as damage to the in-core monitor guide tube 95 due to a temperature change at the time of operation of the reactor.

The control-rod guide tubes 30 are provided as guide tubes for a cluster type control rod. However, the control-rod guide tubes 30 may be provided as guide tubes for control rods other than the cluster type control rod. The in-core monitor guide tubes 40, 84, and 95 are provided as guide tubes for an in-core neutron monitor. However, the in-core monitor guide tubes 40, 84, and 95 may be provided as guide tubes for monitors other than the in-core neutron monitor.

The numbers of the rib plates 60, the rib plates 86, and the monitor-guide-tube fixing sections 41 of the in-core monitor guide tubes 40 and 84 provided in the in-core-monitor-guide-tube supporting apparatuses 10 and 80 are four for each of the in-core monitor guide tubes 40 and 84. However, the numbers of the components may be any numbers other than four.

The drain holes of the rib plates are formed only in the rib plates 86 of the in-core monitor guide tubes 84 included in the in-core-monitor-guide-tube supporting apparatus 80. However, the drain holes 87 may be formed in the rib plates 60 of the in-core monitor guide tubes 40 included in the in-core-monitor-guide-tube supporting apparatus 10.

The tie plate included in the in-core-monitor-guide-tube supporting apparatus 90 according to the third embodiment is formed by the two tie plates, namely, the upper tie plate 100 and the lower tie plate 110. However, the tie plate may be formed by three or more tie plates. A plurality of tie plates are fixed to the in-core monitor guide tubes 95 in a plurality of positions in the length direction of the in-core monitor guide tubes 95. The in-core monitor guide tubes 95 are integrally fixed to the reactor vessel 300. This makes it possible to improve rigidity of the entire in-core monitor guide tubes 95 and realize vibration damping for the in-core monitor guide tubes 95.

The upper tie plate 100 and the lower tie plate 110 included in the in-core-monitor-guide-tube supporting apparatus 90 according to the third embodiment fix the lower-tie-plate flanges 112 to the core-support-plate flanges 130, which are fixed to the reactor vessel 300, to indirectly fix the in-core monitor guide tubes 95 to the reactor vessel 300. However, the upper tie plate 100 and the lower tie plate 110 may be directly fixed to the reactor vessel 300. The upper tie plate 100 and the lower tie plate 110, which couple the in-core monitor guide tubes 95, may be directly or indirectly fixed to the reactor vessel 300 as long as the upper tie plate 100 and the lower tie plate 110 can fix the in-core monitor guide tubes 95 to the reactor vessel 300.

Figure 13:
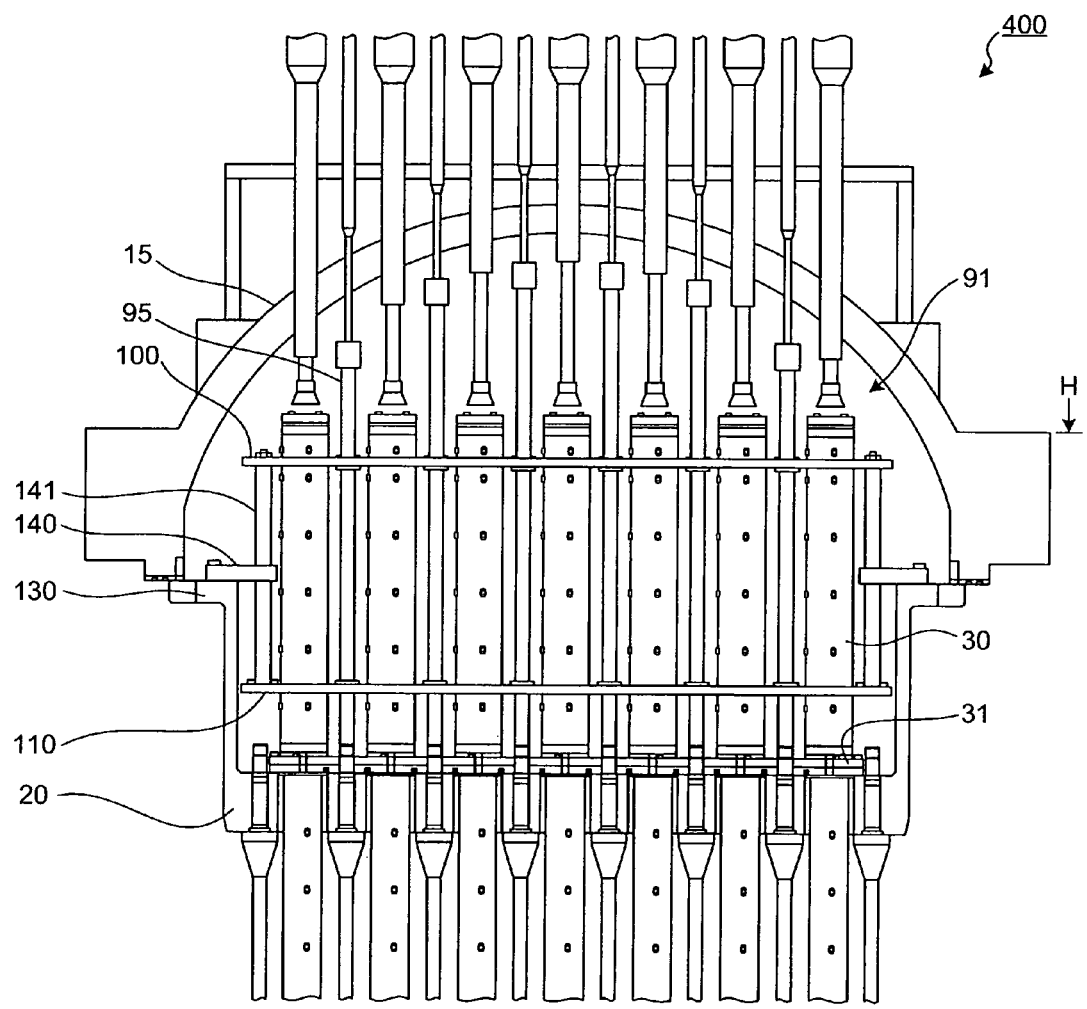
FIG. 13 is a schematic of a variant of the in-core-monitor-guide-tube supporting apparatus shown in FIG. 10.

FIG. 13 is a schematic of relevant parts of a reactor vessel 400 that includes an in-core-monitor-guide-tube supporting apparatus 91 according to a variant of the in-core-monitor-guide-tube supporting apparatus 90. In the in-core-monitor-guide-tube supporting apparatus 90, the upper-tie-plate flanges 102 and the lower-tie-plate flanges 112 are connected to the upper tie plate 100 and the lower tie plate 110 via the upper-tie-plate rib 101 and the lower-tie-plate rib 111. However, in the in-core-monitor-guide-tube supporting apparatus 91, a tie-plate flange 140 formed in a circular integral shape is provided instead of the upper-tie-plate flanges 102 and the lower-tie-plate flanges 112. Moreover, a plurality of columnar tie-plate support columns 141 are provided instead of the upper-tie-plate rib 101 and the lower-tie-plate rib 111 to connect the tie-plate flange 140 and the lower-tie-plate flanges 112 and the columnar tie-plate support columns 141 connected to the tie-plate flange 140. This makes it possible to easily adjust positions of the upper tie plate 100 and the lower tie plate 110 at the time of assembly. As a result, it is possible to accurately assemble the in-core monitor guide tubes 95.

There is an effect that the in-core-monitor-guide-tube supporting apparatus according to the present invention can realize vibration damping for the in-core monitor guide tubes.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-core-monitor-guide-tube supporting apparatus configured to be disposed in a reactor vessel, the apparatus comprising:
   a plurality of in-core monitor guide tubes configured to guide a plurality of in-core neutron monitors that measure neutrons in the reactor vessel, and comprising upper tie-plate fixing sections and lower tie-plate fixing sections projecting in a radial direction of the in-core monitor guide tubes;
   a plurality of control-rod guide tubes being cylindrical in shape, and configured to function as guide tubes in each of which a control rod is driven;
   a core support plate, wherein each of the plurality of control-rod guide tubes has first and second ends opposite to each other, and the second end is located closer to the core support plate than the first end;
   a plurality of control-rod-guide-tube fixing sections formed by flanges being substantially rectangular in shape when viewed in an axial direction of the control-rod guide tube, wherein the plurality of control-rod-guide-tube fixing sections are fixed to the second ends of the control-rod guide tubes, and are detachably fixed to an upper surface of the core support plate with bolts without being in direct contact with a lower surface of the core support plate such that each of the control-rod guide tubes is removable in the axial direction of the control-rod guide tube together with the corresponding control-rod-guide-tube fixing section;
   a plurality of tie plates including an upper tie plate fixed to the upper tie-plate fixing sections of the in-core monitor guide tubes and a lower tie plate fixed to the lower tie-plate fixing sections of the in-core monitor guide tubes, wherein a thickness direction of the tie plates is an axial direction of the in-core monitor guide tubes, wherein a plurality of monitor-guide-tube through-holes and control-rod-guide-tube through-holes are formed in the tie plates in positions corresponding to the in-core monitor guide tubes and the control-rod guide tubes, wherein the control-rod-guide-tube through-holes are formed such that not only the control-rod guide tubes but also the control-rod-guide-tube fixing sections can pass through the control-rod-guide-tube through-holes;
   an upper-tie-plate rib formed from the upper tie plate towards the core support plate;
   an upper-tie-plate flange connected to an end in a direction of the core support plate of the upper-tie-plate rib;
   a lower-tie-plate rib formed from the lower tie plate towards the upper-tie-plate; and
   a lower-tie-plate flange connected to an end in the top cover direction of the lower-tie-plate rib, connected to the upper-tie-plate flange and fixed to the core support plate.

2. The in-core-monitor-guide-tube supporting apparatus according to claim 1, wherein each of the in-core monitor guide tubes are cylindrical in shape.

* * * * *